(12) United States Patent
Johnson et al.

(10) Patent No.: US 7,512,095 B2
(45) Date of Patent: Mar. 31, 2009

(54) MULTIPLE ACCESS COMMUNICATION SYSTEM FOR MOVEABLE OBJECTS

(76) Inventors: Mark M. Johnson, 1234 Shine Rd., Port Ludlow, WA (US) 98365; Andreas Lesch, Babenbergerstrasse 12A, 2410 Hainburg 10 (AT)

(*) Notice: Subject to any disclaimer, the term of this patent is extended or adjusted under 35 U.S.C. 154(b) by 994 days.

(21) Appl. No.: 10/709,928

(22) Filed: Jun. 7, 2004

(65) Prior Publication Data

US 2005/0129050 A1    Jun. 16, 2005

Related U.S. Application Data

(60) Provisional application No. 60/477,125, filed on Jun. 9, 2003.

(51) Int. Cl.
*H04W 4/00* (2006.01)
*H04L 12/413* (2006.01)

(52) U.S. Cl. .................. 370/329; 370/336; 370/445; 370/503; 455/456.1

(58) Field of Classification Search ............... 370/329, 370/336, 345, 347, 445, 447, 458, 459, 498, 370/503; 455/456.1, 456.5, 456.6, 509, 512, 455/73, 78, 12.1, 427
See application file for complete search history.

(56) References Cited

U.S. PATENT DOCUMENTS

| | | | | |
|---|---|---|---|---|
| 3,774,215 A * | 11/1973 | Reed | ........................ | 342/458 |
| 4,751,701 A * | 6/1988 | Roos et al. | .................. | 370/445 |
| 5,930,706 A * | 7/1999 | Raith | ....................... | 455/422.1 |
| 5,960,355 A * | 9/1999 | Ekman et al. | ............ | 455/456.1 |
| 6,163,680 A * | 12/2000 | Bridle et al. | ............... | 455/509 |
| 6,882,301 B2 * | 4/2005 | Fullerton | ..................... | 342/21 |

* cited by examiner

*Primary Examiner*—Quochien B Vuong
(74) *Attorney, Agent, or Firm*—Malin Haley DiMaggio Bowen & Lhota, P.A.

(57) ABSTRACT

A non-complex low cost communication, navigation and identification system and method for use with moveable or stationery objects on the same frequency without interference. The present invention listens before each transmission and transmits only when there are no other protocols transmitting, thus avoiding communication collisions and supporting high channel load scenarios.

14 Claims, 2 Drawing Sheets

MULTIPLE ACCESS COMMUNICATION SYSTEM FOR MOVEABLE OBJECTS

BACKGROUND OF INVENTION

1. Field of the Invention

This invention relates to a method and apparatus for relating the geographical position data of one or more moving or stationary objects, to one or more other moving or stationary objects on the same communication frequency without interfering with any other users and, specifically, to a simple identification and geographical location system and method for moving objects (such as boats) that can transmit position data on the same communication channel without interfering with other communication users on the same frequency, even if other users have a different data transmission protocol.

2. Description of Related Art

Small boats need to be identified, especially because they are poor radar targets. A low cost, non complex type of identification system is needed. It must gracefully coexist with other communication systems with out creating interference.

The present invention is a non-complex data communication system that listens on a given RF frequency and transmits own position data only when there are no other user transmissions. The invention listens for a predefined time period (a so called Detection Period) before transmitting. This is long enough to detect any other transmissions. If there are no other signals heard after the detection period, then the present invention can transmit. The system and method can transmit a data packet when the frequency channel is empty. Based on the system, there can not be interference with other transmissions on the same frequency.

SUMMARY OF INVENTION

A communication method and system to identify and locate moving objects such as boats using a common communication channel and frequency to avoid interference with other users including different data protocols that includes the following steps:

(a) Listen in each detection period before sending;
(b) Listen on a assigned group frequency and synchronize to any existing data communication traffic;
(c) Be polite. If there is energy in the detection period recognized, the channel is occupied. Never transmit when a channel is occupied. Wait to transmit until the communication channel is empty.
(d) Send one packet of a fixed duration;
(e) Probably operate at lower power in order to reduce interference with other communication protocols.

The present invention does not use UTC for any timing, and it has no use of slot numbers, frames, or slot management. The present system, uses a pure RATDMA ALOHA, like system which is common practice.

The synchronization system is very simple. All that is necessary is to synchronize a clock oscillator to any received communication. All system transmitted packets must be "short" for a predetermined fixed time.

The receiver, transmitter and associated circuitry is mounted in a completely waterproof housing about the size of a handheld flashlight. It is intended to be mounted on a moveable or stationery object, such as a sailboat mast or crab pot buoy as examples of use.

The invention has the following components:
1. 1 crystal controlled transmitter.
2. 1 crystal controlled receiver.
3. 1 integral EPFS (electronic position fixing system).
4. 1 low powered microcontroller.
5. 1 power supply.
6. 1 operation indicator Possible modes of operation:
1. The unit may sleep much of the time to save power. It uses a manufacturer proprietary intelligent wakeup function to be awake when needed and synchronizes to any other communication protocol units in the area if there are any.
2. The unit only transmits when it hears others within its "group."
3. It also only transmits when the desired group is "close" which is a programmable distance.

The invention makes very good use of the VDL (VHF Data Link). The system is silent most of the time and during those short periods of transmission time, power usage is low.

The system can also be used on a small sailboat much like a radar reflector. In that case, it would be set to report when it hears any other participant in any receivable range.

It is an object of this invention to provide a noncomplex communication system for multiple users to transmit data without interference with other transmissions on the same communication channel.

And yet still another object of this invention is to provide a multi user communication system on the same frequency which allows users to transmit data to other users without communication interference even if other protocols are using the same communication frequency.

And yet still another object of this invention is to provide a communication system that allows moveable objects such as boats to transmit navigation information to other users on the same frequency without interference including the use of other protocols on the same channel.

In accordance with these and other objects which will become apparent herein after, the instant invention will now be described with particular reference to the accompanying drawings.

DETAILED DESCRIPTION

Figure 1:
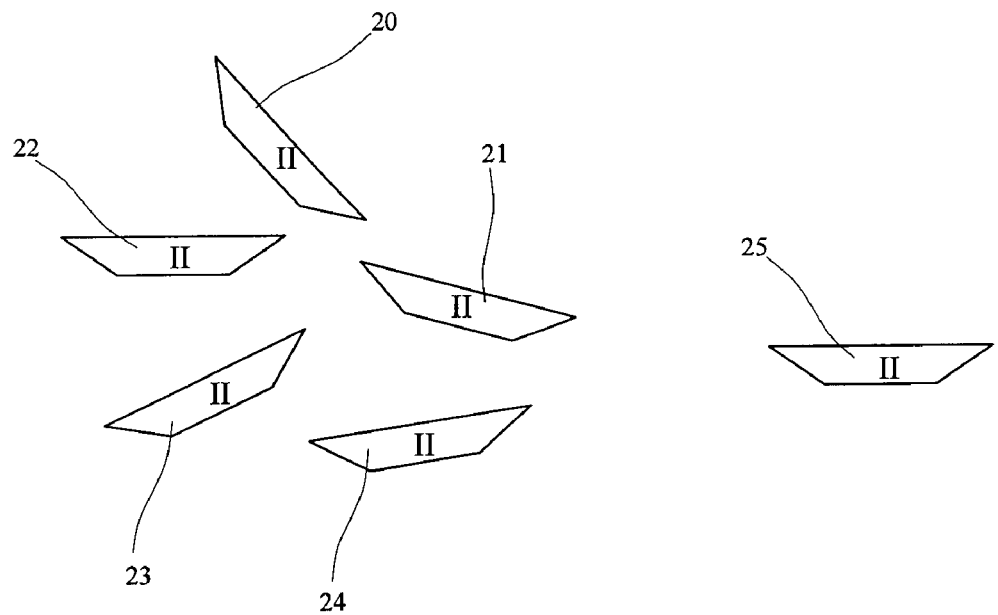
FIG. 1 shows a schematic diagram representing many moveable objects.
Figure 2:
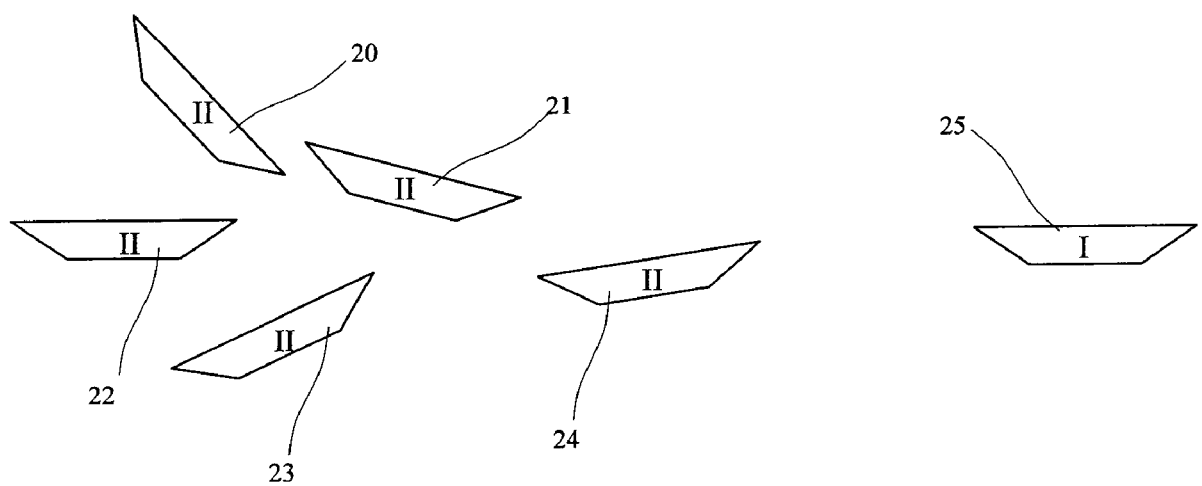
FIG. 2 shows a schematically diagram of moveable objects including different classes of priority and weighting.

Referring now to the drawings, FIGS. 1 and 2, a group of several moving participants 20, 21, 22, 23, 24 and 25 are shown that represent participants in a communication system. Each one of the moving participants shown in FIG. 1 could include a communication device 10 shown in FIG. 3. For sake of example, the moveable objects in FIG. 1 could represent boats or ships and the information that is transmitted in the communication system servicing all the same users indicated by Group II having a similar protocol in accordance with the present invention would allow the transmission of positioning data among the moveable objects or users. Each of the moveable objects and the system employed on board will practice the method of the invention which is to only transmit positioning data to other moveable objects on the same frequency after listening to insure that transmission can be accomplished without interference. So each of the devices on board 10 include a unit for detecting free transmission time within which a transmitter can be activated.

Referring now to FIG. 2 again a group of moveable participants, 20, 21, 22, 23, 24, 25 are shown. The first group 20 through 24 shows moveable objects represented by II. The participant 25 is represented by I. This drawing represents the fact the communication system can exist where there are two different protocols including Groups I and II that can co-exist with the present invention and still allow the transmission of any type of data among all of the users without interference, although all users Group I and II are on the same frequency channel.

Figure 3:
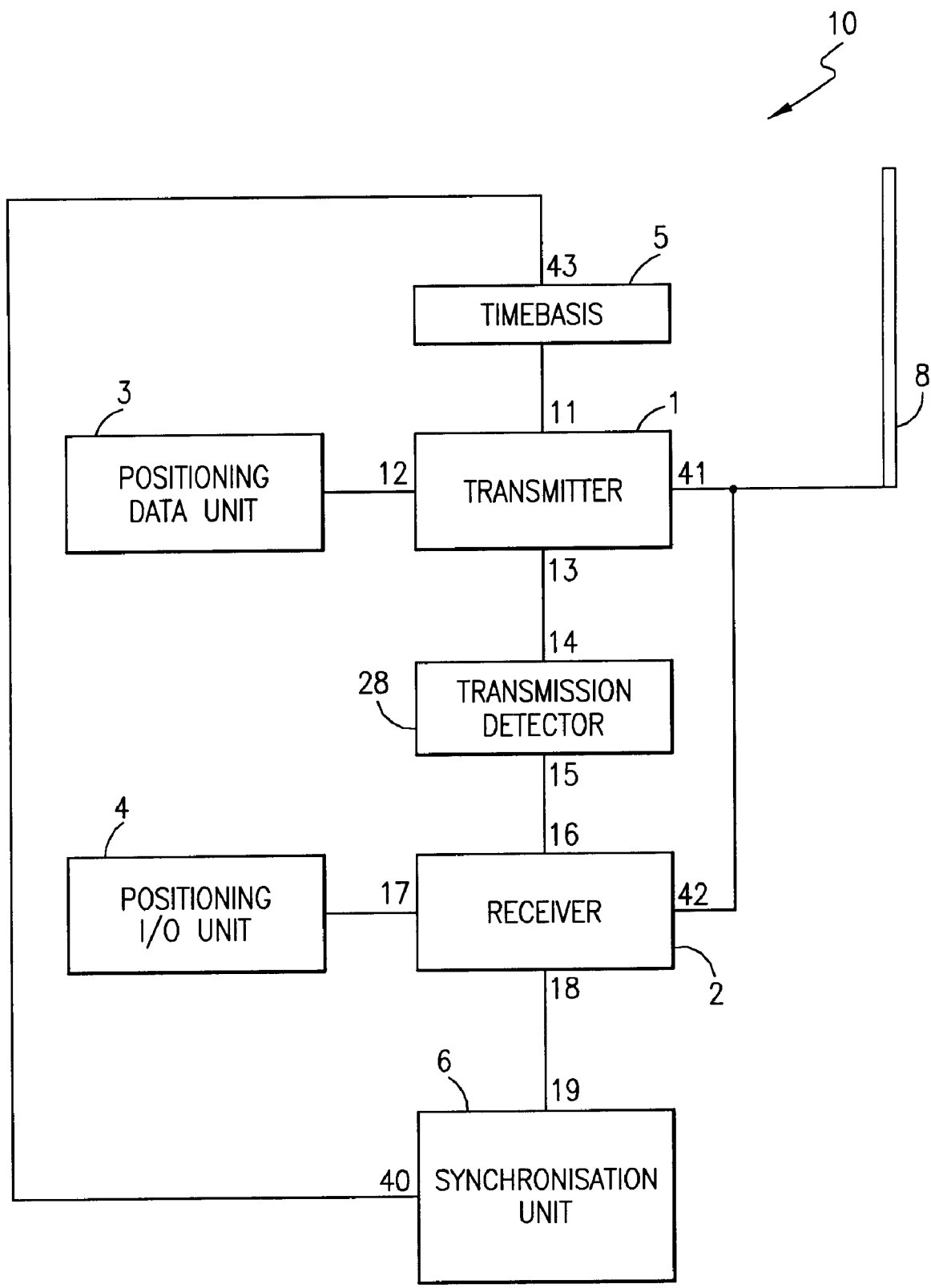
FIG. 3 shows a block diagram of the present invention.

Referring now to FIG. 3, the overall invention is shown at 10 including an RF radio transmitter 1 and an RF radio receiver 2. The transmitter can be a one crystal controlled transmitter. The receiver 2 is a one crystal controlled receiver. The system also has a positioning I/O unit 4 that includes a low power microcontroller. The system includes an antenna 8 for transmission and reception of signals. The transmitter 1 and the receiver 2 both use the same antenna 8. The receiver is connected to the positioning unit and a transmission detector 28. The system also includes positioning data unit 3 (EPFS) that provides the user's own position data to transmitter 1 via input 12. The synchronization unit 6 allows synchronization between the receiver 2 and the transmitter 1 through time basis 5. The positioning data unit 3 provides own navigation data which is transmitted periodically from transmitter 1 from antenna 8. In operation the receiver listens for outstanding data transmissions before transmitting the users own data. If other data transmissions are heard the system will not transmit. The system is a polite system and only transmits when there are no other indication of data transmission in the area. The system will listen within a detection period of silence to indicate there is no other data transmission. The presence system is synchronized by the synchronization unit 6 using a oscillator with a fixed period of milliseconds for synchronization. The signal is provided to the time basis 5 it allows for synchronization of transmission from the transmitter 1 during appropriate periods of silence.

In system operation, the system is designed to listen on the assigned radio frequency that can include other protocol transmissions. The system will not transmit if there are other transmissions that it hears. It will listen to other traffic especially a higher order protocol. If the channel is occupied, the system will not transmit. If there is a packet occupied, then the system will wait a random number of empty time segments and then transmit in the next available empty time segment. The system sends only one packet, of short duration so that the system cannot spill over into another time segment. Another feature in the system is that the invention could operate at lower power in order to synchronize with other protocols before being heard.

The present invention does not require UTC for any timing. The present invention does not have any reference or concept of the slot numbers, frames or slot management. When there is no higher protocol activity detected, it uses a pure RAT-DMA Aloha system which transmits when there is no other activity within a certain time frame.

The synchronization system uses a clock oscillator for synchronization. A typical clock oscillator may have a frequency of 37.5 Hz with a period of 26.67 ms. If there are more than one other protocol targets, a simply system for choosing which targets to synchronize to may be used that may include the average of the closest of targets. Distance correction of timing may also be incorporated.

In operation, the present invention could be mounted on a boat probably in an area where there is another protocol using the same frequencies that may have allotted slots for users. Within the allotted slots, there are empty slots. The present invention listens and can only transmit when there is an empty slot available in time. This ensures that the present invention will never interfere with other transmissions belonging to a different protocol. The present invention uses only available empty time slots for transmission.

Because the present invention is not time based on UTC time and it is not based on a slot management protocol, the overall system is less complex and much less expensive to manufacture and use. The present invention does not operate in this manner because it forms a separate system that synchronizes too but does not interfere with the other protocol communication systems.

Since it is not necessary to maintain a time segment mapping, receivers may be strobed to save power or scanned to give multichannel capability with a single receiver.

Some of these "dumb" units may be crab pot buoy makers that do not need to be seen by everybody. By being silent when not needed, they minimize loading on the portion of the VDL.

Some, such as crab pot units, may only report when specific ships or groups are heard. (Your crab pot goes quiet and saves power until you approach it. Then it starts reporting.) This reporting could also be dependent on distance, such as not transmitting until a "smarter"unit within 5 miles is heard.

The portion of time segments available to this units will be that portion not used by other protocols. This invention is basically a Slotted Aloha system. Maximum throughput for ALOHA systems is generally accepted as being about 18%. Slotted ALOHA systems are about 38%. That is NOT the case in this application.

Packets are broadcast to many potential receivers and there is no ACK/NAK reply. Whether a receiver receives a packet depends upon distance and ratio of distance to any colliding packets. Whether the packet gets through depends upon which receiver you refer to, whether there was a collision and the ratio of distance from desired and colliding packets. If the colliding packet is more than twice as far away from the receiver, the desired packet will probably be received correctly because of discrimination (so channel rejection). If the colliding packet is less than half as far from the receiver, the colliding packet will be received correctly.

As the packet activity goes up the cell size shrinks, but the closest packets are still the most likely to be received. Although this may seem like a slotted ALOHA method, it has a much higher potential throughput than the slotted ALOHA 38%. This is because of the discrimination capability based upon distance of this application.

The odds of receiving a packet correctly, or stated differently, the time between correctly received packets, is strongly related to the proximity of the target transmitter. As targets get closer, they are received better. This is exactly what we want.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. A communication system comprising several moving participants (20, 21, 22, 23, 24, 25) that are each equipped with a communication device (10) for exchanging information having a transmitter, transmissions from said transmitter, and receiver (1, 2) characterized by a method, for detecting free transmission periods (8) which control the transmissions of the transmitter (1);

means for detecting transmission periods by a transmission detector (8), its input (15) being connected to a first output (16) of the receiver (2) and its output (14) being connected with a first input (13) of the transmitter (1);

the transmission detector (8) scanning, within a predictable window of time, for the appearance of transmissions initiated by other participants with the receiver (2) and releases the transmitter (1) for communicating navigational data if such transmissions do not appear.

2. A communication system on the same RF frequency with several moving participants (20, 21, 22, 23, 24, 25) that are each equipped with a communication device (10) for exchanging information having a transmitter, transmissions from said transmitter, and receiver (1, 2) characterized by a method, for detecting free transmission periods (8) which control the transmissions of the transmitter (1);
a second input (11) of the transmitter (1), having a time basis (5) for generating a transmission frame characterized in that methods for synchronizing the time basis (5) of each moving participant (20, 21, 22, 23, 24 and 25) only depends on a minimum of one relevant participant within the receiving range; and
the time basis (5) having a steering input (43) which drives the transmission frame within a moveable time period and that the means for synchronizing the time basis (5) are provided by a synchronization unit (6) which has an output(40) connected to the steering input (43) of the time basis (5) and a second input (18) of the receiver (2) connected to the input (19) of the synchronization unit (6), so that a transmission signal is in direct timing relation to the transmission of one or more other participants.

3. The communication system of claim 2, characterized in that the transmitter and receiver (1, 2) of the Communication Unit (10) are driven by a TDMA (time division multiple access) method, where the transmission frame is divided in predictable numbers of transmitting and receiving windows of time.

4. The communication system of claim 2 characterized in that a third input (12) of the transmitter (1) of the Communication Unit (10) is connected to a positioning data unit (3) that indicates the position data and forwards this information to the transmitter (1) from which it will be broadcasted.

5. The communication system of claim 4, characterized in that the positioning data unit (3) is a electronic fixing device.

6. A communication system on the same RF frequency with several moving participants (20, 21, 22, 23, 24, 25) that are each equipped with a communication device (10) for exchanging information having a transmitter, transmissions from said transmitter, and receiver (1, 2) characterized b a method, for detecting free transmission periods (8) which control the transmission of the transmitter (1);

the synchronization unit (6) providing the means for weighting from the receiver (2) and received transmissions with defined factors for correcting the synchronization error; and
the own transmission timing correction is a function of weighting different predetermined groups and numbers of participants in those groups.

7. A communication system in the same frequency as in claim 6 including; means to exchange information between moving participants, characterized in that the appearance of transmission of other moving participants will be supervised and in the absence of such transmission own information will be transmitted.

8. A communication system as in claim 7, characterized in that the transmission signal will be sent within the transmission frame that is defined over the time basis and the sending signal of other participants could be received, within such a window of time and the possible transmission of other participants can be received and detected and in the absence of such receiving signals the window of time will be used for the own transmission.

9. A communication system as in claim 8, characterized in that the position data will be sent as information.

10. A communication system as in claim 9, characterized in that each participant will make use of its own transmission frame unsynchronized as long as there is no other transmission received from another participant within this predictable time frame.

11. A communication system as in claim 8, characterized in that according to the transmission signal and possibly the content of the transmission of other participants a relation of the weighting factors to them could be done, and due to that the timing correction of the transmission frame for a particular participant could be calculated and established.

12. A communication system as in claim 11 characterized in that other participants are organized into defined groups according to similar criteria with the same weighting factor to be used to correct the transmission timing.

13. A communication system as in claim 8, characterized in that TDMA (time division multiple access) methods with a number of transmitting and receiving windows of time could be used as transmission frame.

14. A communication system as in claim 7, characterized in that each participant transmits periodically and the received signals of a minimum of one or more participants will be used for a possible adjustment of the synchronization of the transmission frame.

* * * * *